United States Patent

Rohr et al.

[11] 3,721,741
[45] March 20, 1973

[54] COMBATTING PHYTOPATHOGENIC FUNGI ON PLANTS WITH SUB-PHYTOLOXIC FUNGICIDALLY EFFECTIVE AMOUNTS OF HERBICIDAL N-PHENYL DERIVATIVES OF 3,5-DIHALO-SALICYLALDEHYDE

[75] Inventors: Otto Rohr, Therwil; Ludwig Ebner, Stein/Ag.; Volker Dittrich, Basle; Heinz Siegle, Binningen, all of Switzerland

[73] Assignee: Ciba-Geigy AG, Basle, Switzerland

[22] Filed: Oct. 4, 1971

[21] Appl. No.: 186,497

Related U.S. Application Data

[60] Division of Ser. No. 31,868, April 1, 1970, Pat. No. 3,652,770, which is a continuation of Ser. No. 677,760, Oct. 24, 1967, abandoned.

[30] Foreign Application Priority Data

Oct. 28, 1968 Switzerland.....................15711/68

[52] U.S. Cl. .....................424/330, 71/104, 71/105, 71/121, 260/566 A, 260/566 F, 424/327
[51] Int. Cl. ...............................................A01n 9/20
[58] Field of Search.........424/327, 330; 260/566 A, 260/566 F

[56] References Cited

UNITED STATES PATENTS 3,357,883 12/1967 Pillon et al. ...........................424/327
2,822,297 2/1958 Klein et al. .........................117/138.5

*Primary Examiner*—Shep K. Rose
*Attorney*—Karl F. Jorda et al.

[57] ABSTRACT

A preparation for combating harmful insects, acarides, nematodes phytopathogenic fungi and bacteria, which comprises, as active substance, a compound of general formula

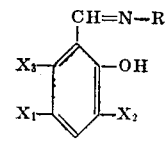

wherein $X_1$ and $X_2$ represent halogen atoms, $X_3$ represents a hydrogen or a halogen atom and R represents the hydroxyl group or an aryl or an aralkyl residue which is substituted by at least one member selected from the group consisting of a halogen atom, the $CF_3$ $NO_2$, CN, alkyl, alkoxy, SCN and a tertiary amino group, together with a carrier. If desired, there may be present one or more of the following additives: a carrier, a solvent, a dilvent, a dispersing agent, a wetting agent, an adhesive, a fertilizer or other pesticides.

5 Claims, No Drawings

COMBATTING PHYTOPATHOGENIC FUNGI ON PLANTS WITH SUB-PHYTOLOXIC FUNGICIDALLY EFFECTIVE AMOUNTS OF HERBICIDAL N-PHENYL DERIVATIVES OF 3,5-DIHALO-SALICYLALDEHYDE

This is a division of application Ser. No. 31,868, filed on Apr. 1, 1970, now U.S. Pat. No. 3,652,770, which in turn is a continuation of application Ser. No. 677,760, filed on Oct. 24, 1967, now abandoned.

The present invention relates to preparations for combating pests, especially harmful insects, acarides, nematodes, phytopathogenic fungi and bacteria, which comprise, as active substance, a compound of general formula

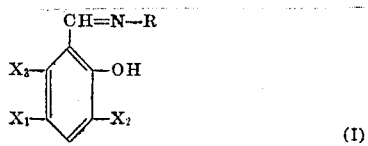

(I)

wherein $X_1$ and $X_2$ represent halogen atoms, especially chlorine, bromine or iodine atoms, $X_3$ represents a hydrogen or a halogen atom, especially chlorine, and R represents the hydroxyl group, an aryl or aralkyl residue which is substituted by at least one of the following substituents: a halogen atom, a $CF_3$, $NO_2$, CN, alkyl, alkoxy, SCN or a tertiary amino group, together with a suitable carrier.

If desired, there may be present one or more of the following additives: a carrier, a solvent, a diluent, a dispersing agent, a wetting agent, an adhesive, a fertilizer as well as, if desired, other known pesticides.

The active substances of formula I are Schiff bases or oximes and are easily obtainable by reaction of araliphatic or aromatic amines or hydroxylamine with halogenated salicylaldehydes.

As a result of their broad biocidal effect, the new preparations are especially advantageous in that they can be used for combating very diverse plant and animal pests.

When used in plant protection at a concentration which does not permit any phytotoxic phenomena to arise, they show an excellent effect against harmful micro-organisms, for example, against fungi, for example, Alternaria solani, Phytophthora infestans and Septoria apii, as well as against harmful insects, acarides, nematodes and their eggs or larvae.

When used at a higher concentration, the preparations of this invention also have a herbicidal effect and inhibit plant growth.

They also show, at low concentrations, a lethal effect on water pests such as algae, slime bacteria and tube-dwelling worms, and are furthermore effective against gastropodes, for example, Australorbis glabratus.

Furthermore the new preparations can generally be used as microbiocides, for example, against varieties of Aspergillus and also as insecticides, for example, against midges and flies.

The oxime of 3,5-dibromo-or dichlorosalicylaldehyde is, for example, very effective against plant-pathogenic fungi.

The compound of the formula

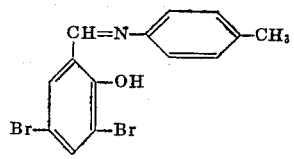

is also remarkable for its strong action against mildew.

The new preparations can be applied in many different forms. They may be used in the form of dusts, emulsions or spraying solutions, granules and the like.

Possible materials for the manufacture of directly sprayable solutions of the compounds of general formula (I) are, for example, mineral oil fractions of high to medium boiling range, for example, diesel oil or kerosene, coal tar oil and oils of vegetable or animal origin, as well as hydrocarbons for example, alkylated naphthalenes and tetrahydronaphthalene, with the use, if desired, of xylene mixtures, cyclohexanols, ketones, and furthermore chlorinated hydrocarbons, for example, trichlorethane and tetrachlorethane, trichlorethylene or trichlorobenzenes and tetrachlorobenzenes. It is advantageous to use those organic solvents having boiling points above 100°C.

It is especially advantageous to prepare aqueous application forms from emulsion concentrates, pastes or wettable spraying powders, by adding water. Possible emulsifiers or dispersing agents are non-ionic products, for example, condensation products of aliphatic alcohols, amines or carboxylic acids having a long chain hydrocarbon residue containing about 10 to 20 carbon atoms and ethylene oxide, for example, the condensation product of octadecyl alcohol and 25 to 30 mols of ethylene oxide or that of soya fatty acid and 30 mols of ethylene oxide or that of soya fatty acid and 30 mols of ethylene oxide or that of commercial oleylamine and 15 mols of ethylene oxide or that of dodecylmercaptan and 12 mols of ethylene oxide. Amongst the anionic emulsifiers which may be employed, there may be mentioned: the sodium salt of dodecyl alcohol sulphuric acid ester, the sodium salt of dodecylbenzenesulphonic acid, the potassium or triethanolamine salt of oleic acid or of abietic acid or of mixtures of these acids or the sodium salt of a petroleum sulphonic acid. Possible cationic dispersing agents are quaternary ammonium compounds, for example, cetyl pyridinium bromide or dihydroxyethyl benzyl dodecyl ammonium chloride.

In order to manufacture dusting and scattering agents, talc, kaolin, bentonite, calcium carbonate, calcium phosphate, and also charcoal, cork flour, wood flour and other materials of vegetable origin, may be employed as solid carriers. It is also advantageous to produce the preparations in a granulated form. The various use forms can, in the usual manner, be provided with additives which improve the distribution, adhesion, rain resistance or penetrating power; fatty acids, rosin, glue, casein or alginates may be mentioned as such substances.

The preparations according to the invention may be used by themselves or together with conventional pesticides, especially insecticides, acaricides, nematocides, bactericides or further fungicides or herbicides.

The following Examples illustrate the invention:

Example 1

The Schiff's bases are manufactured by known methods such as are for example described in Weygand-Hilgetag, Organisch-chemische Experimentierkunst, p. 573, see 1964 edition.

The following compounds were prepared:

|  | Br, OH / Br —CH=N—R | | Cl, OH / Cl —CH=N—R | | I, OH / I —CH=N—R | |
|---|---|---|---|---|---|---|
| R= | Number | M.P. (deg.) | Number | M.P. (deg.) | Number | M.P. (deg.) |
| —C₆H₄—CF₃ (Pat. No. 4212391) | 1 | 105–107 | 11 | 98–100 | 21 | 124–126 F. 386 |
| —C₆H₄—CH₃ (H₃C-) | 2 | 117–118 | 12 | 89–90 | 22 | 126–127 |
| —C₆H₄—Cl | 3 | 138–139 | 13 | 125–126 | 23 | 131–132 |
| —C₆H₄—CH₃ | 4 | 129–130 | 14 | 120–121 | 24 | 119–121 |
| —C₆H₄ (o-CH₃) | 5 | 128–130 | 15 | 94–95 | 25 | 180–182 |
| —C₆H₃(Cl)(NO₂) | 6 | 200–203 | 16 | 135–151 | 26 | ---- |
| —C₆H₃(CH₃)(Cl) | 7 | 159–161 | 17 | 153–154 | 27 | ---- |
| —C₆H₃(Cl)(Cl) | 8 | 160–162 | 18 | 171–173 | 28 | ---- |
| —C₆H₃(CF₃)(CF₃) | 9 | ---- | 19 | 122–124 | 29 | 169–170 |
| —OH | 10 | 217–218 | 20 | 194–195 | 30 | 200–206 |

Example 2 a. A spraying powder of the following composition was produced:

| | |
|---|---|
| 50% | of one of the active substances listed as Nos. 1 to 30 in Example 1, |
| 33.5% | of Bolus alba (kaolin) |
| 11% | of the ammonium salt of ligninsulphonic acid |
| 4.5% | of sodium dinaphthylmethanedisulphonate [a product commercially available under the tradename "Neradol"] |
| 1% | of a mixture of 40 parts of alkylarylpolyethyl alcohol and 60 parts of magnesium carbonate [a product commercially available under the tradename "Triton X 120"]. |

The finely ground mixture so obtained can be diluted with water as desired to give a ready-to-use spraying broth.

b. 40 Parts of the compounds No. 1 to 30 of Example 1 were mixed with 25 parts of a mixture of an anionic surface-active compound, preferably the calcium or magnesium salt of mono-laurylbenzenemonosulphonic acid, and a non-ionic surface-active compound, preferably a polyethylene glycol ether of the monolauryl ester of sorbic acid, and diluted to 100 cm³ with xylene. A clear solution was obtained which was used as spraying material concentrate and could be emulsified by pouring into water.

Example 3

A. Acaricidal and Insecticidal Effect:

a. Phaseolus vulgaris (bush beans) have an infested piece of a leaf from a mass culture of Tetranychus urticae laid on them 12 hours before testing for the acaricidal effect. The mobile stages which have travelled across are dusted with the emulsified test preparations from a chromatography atomizer in such a way that the spraying solution does not run off. After 2 to 7 days in greenhouses at a temperature of 25°C larvae, adults and eggs are evaluated for numbers of living and dead individuals under a binocular microscope, and the result is expressed in percentages.

The preparation according to Example 1 No. 4, showed the following results at 400 ppm active substance (deaths in %):

| Effect after: | Eggs | Larvae | Adults |
|---|---|---|---|
| 2 days | — | 100 | 100 |
| 7 days | 90 | 100 | 100 |

A similar good effect was also shown by the compound No. 12 of Example 1.

b. The compound No. 19 of Example 1 when used against Orgyia gonostigma still showed 100% deaths after 5 days when used at a concentration of 0.08 %.

B. Fungicidal Effect:

The cotyledon leaves of Cucumis pepo, as well as young tomato and celery plants were treated with a spray broth produced according to Example 2, *a*, and 2, *b* respectively, containing 0.2 percent of the active substance referred to in Example 1 above under No. 20.

2 Days after treatment, the cotyledon leaves of Cucumis pepo were infected with spores of Erysiphe cichoriacearum, the tomato plants with a spore suspension of Alternaria solani and the celery plants with a spore suspension of Septoria apii.

5 Days after infection of the celery and tomato plants, the tomato plants treated with the spray broth according to Example 2 were completely free of attack, in contrast to the heavily attacked control plants. An evaluation of the effect on the cucumber plants, which was carried out after 12 days, showed a 100 percent effect against Erysiphe cichoriacearum. A similar good effect was also shown by the compounds described under Nos. 1, 2, 3, 4, 6, 8, 10, 14, 16, 18, 20, 21, 23, 24, and 25–30.

We claim:

1. A method of combatting phytopathogenic fungi which comprises applying to a plant susceptible to such fungi an active substance in not more than a fungicidally effective amount, said amount being less than a phytotoxic amount, said active substance inhibiting plant growth and having a herbicidal effect when used at a higher concentration and being a compound of the formula

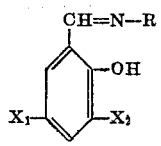

wherein $X_1$ and $X_2$ are identical and selected from the group consisting of chlorine, bromine and iodine, and R represents a phenyl residue which is substituted by at least one member selected from the group consisting of a halogen atom, $CF_3$, $NO_2$, and methyl.

2. A method as claimed in claim 2 wherein the active substance is the compound of the formula

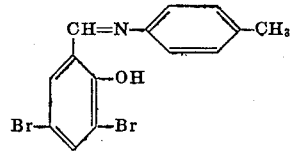

3. A method as claimed in claim 1 wherein the active substance is a compound of the formula:

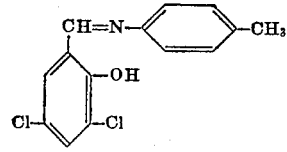

4. A method as claimed in claim 1 wherein the active substance is a compound of the formula:

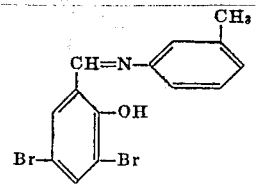

5. A method as claimed in claim 1 wherein the active substance is a compound of the formula:

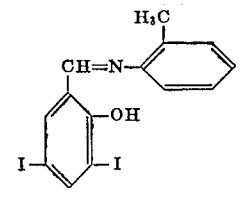

* * * * *